United States Patent [19]
Benedikt et al.

[11] Patent Number: 5,966,535
[45] Date of Patent: *Oct. 12, 1999

[54] METHOD AND APPARATUS FOR GENERATING PROGRAM CODE FOR WORLD WIDE WEB SERVICE APPLICATIONS

[75] Inventors: Michael Abraham Benedikt, Chicago; David Alan Ladd, Downers Grove, both of Ill.; James Christopher Ramming, Menlo Park, Calif.

[73] Assignee: AT&T Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,046

[22] Filed: Dec. 7, 1995

[51] Int. Cl.⁶ .................................................... G06F 9/45
[52] U.S. Cl. .............................................. 395/707; 707/10
[58] Field of Search ..................................... 395/704, 705, 395/701, 706, 774, 707

[56] References Cited

U.S. PATENT DOCUMENTS

| | | | |
|---|---|---|---|
| 5,323,452 | 6/1994 | Dickman et al. | 379/201 |
| 5,644,776 | 7/1997 | DeRose et al. | 707/500 |
| 5,649,186 | 7/1997 | Ferguson | 707/10 |

OTHER PUBLICATIONS

A. Aho, R. Sethi, J. D. Ullman, Compilers: Principles, Techniques, and Tools, Addison–Wesl, pp. 1, 6–8, 10–12, 161–164, 1986.

J. Haycox, "Standard Generalized Markup Language (SGML) as a Basis for an Intelligent Data Management System", IEEE/IEE Publications Ondisc, pp. 1017–1020, 1993.

D. D. Cowan, D. M. German, C. J. P. Lucena, A, von Staa, "Enhancing Code for Readability and Comprehension Using SGML", IEEE/IEE Publication Ondisc, pp. 181–190, 1990.

Berners–Lee, T., "Uniform Resource Locators", Internet–draft, Jan. 1, 1994.

Mallery, J.C., "A Common LISP Hypermedia Server", Artificial Intelligence Laboratory–Massachusetts Institute of Technology, May 5, 1994.

Anderson, S. and Gavin, R., "Sessioneer: Flexible Session Level Authentication With Off The Self Servers An Clients", Internet, ?? 1994.

Concurrent Engineering Research Center, "WEB: Programmer's Manual", Internet, 1994.

Berners–Lee, T. and Connolly, D., "Uniform Resource Locators", Internetdraft, Aug. 4, 1995.

Berners–Lee, T. and Fielding,R.T., "Hypertext Transfer Protocol–HTTP/1.0", Internetdraft, Mar. 8, 1995.

*Primary Examiner*—Majid A. Banankhah

[57] ABSTRACT

A new application language called the MAWL language and a compiler for the new application language called the MAWL compiler are provided for use by programmers of World Wide Web services. The MAWL language and the MAWL compiler may be used to provide any World Wide Web service, but they are especially useful for programming interactive services. The MAWL language provides an expressive typing capability. Through this expressive ability World Wide Web services that have defined states, sequences and sessions are straightforward where previously such capabilities do not exist. Further, the MAWL compiler performs error checking for common errors and self-consistency before actual compiling so run-time error checking is avoided. Together the MAWL language and the MAWL compiler greatly increase the productivity of the World Wide Web programmer and the complexity of the World Wide Web services that can reliably be provided.

20 Claims, 2 Drawing Sheets

METHOD AND APPARATUS FOR GENERATING PROGRAM CODE FOR WORLD WIDE WEB SERVICE APPLICATIONS

TECHNICAL FIELD

The invention relates to a method and apparatus for providing a computer service that is errorless with respect to the source code input, and more particularly to a World Wide Web service that is errorless with respect to its source code input.

DESCRIPTION OF THE PRIOR ART

The scope and diversity of the World Wide Web, hereinafter 'web', are expanding rapidly. Much of the popularity of the web may be attributed to the simplicity and robustness of its underlying protocol, i.e. HyperText Transfer Protocol (HTTP). The source of this simplicity is the fact that HTTP is a stateless protocol, which means that every HTTP transaction is not defined in terms of a transaction or transactions which precede it. Because HTTP was originally designed for straightforward publishing of hypertext documents, this stateless nature of HTTP has not been a major problem until recently.

Now that web browsers and web servers which use HTTP information have become ubiquitous among the users of the Internet and because commercial enterprises are using web servers to provide all types of web services, there is a need for web services and servers for the Internet that provide more than services based on simple hypertext documents. Although a stateless protocol is sufficient for serving stand-alone documents, it is an inconvenient protocol for interactive services, especially those services that have an inherent structure to them such as banking transactions, ticket reservations, and interactive games.

Currently, the major web-specific language is HTML (the HyperText Markup Language), which is geared toward the presentation of static documents. Interactive services are usually provided by creating scripts in languages such as perl or various shells (such as the Kom Shell) which then dynamically generate HTML document-descriptions. web programmers code the storing of state needed for interactive services in various ad-hoc techniques within such scripts. This is known to be a difficult and error-prone task.

In addition to obstacles posed by a stateless protocol, web services must typically be constructed without the basic building-blocks of modem programming practice. Lacking these building-blocks, web programmers must continually reimplement basic programming constructs. For example, memory, including some notion of program counter, must be managed explicitly. The persistence and availability of information used in a service must be attended to explicitly by programmers.

Moreover, programmers must also address problems that are peculiar to web service programming. For example, all Web programmers must guard against a user's failure to fill in required form fields, when gathering several pieces of information from the user. Presently, programmers would have to explicitly code such checks and generate documents giving feedback to erroneous responses, a tedious and repetitive task. Also, because servers handle numerous requests concurrently, programmers are compelled to invent methods to protect resources such as shared files from conflicting simultaneous requests. Since the methods for doing such protection and the responses to the user when conflicts occur are generally straightforward, it would be desirable to automate the coding of such protection mechanisms.

In order to provide quality services, web programmers need appropriate reusable abstractions available. Unfortunately, the commonly used languages for building web services (e.g., Tcl, perl, and Awk) and various shells (e.g., Korn) are seriously lacking in the way of static analysis or guarantees which aid in the development of reusable abstractions. Further, general-purpose languages such as ML, C++, and Eiffel, which as a matter of predetermined policy guard against dynamically discovered errors, do not specifically address common web-programming errors, e.g., dangling Universal Resource Locators (URLs) and incorrect HTML code. No existing language provides infrastructure necessary to create reusable abstractions that are useful to web programmers while facilitating the generation of error-free code.

It is an object of the present invention to provide a system in which typical web programming problems are checked and detected at compile time.

It is another object of the present invention to provide a web programming language that has a concept of a present state relative to a previous state.

It is another object of the present invention to provide a web programming language and associated compiler that facilitates the reuse of solutions to common web programming problems.

It is another object of the present invention to provide a way to check for and uncover web-specific programming errors at compile time before actual execution.

SUMMARY OF THE INVENTION

Briefly stated, in accordance with one aspect of the invention, the aforementioned objects are achieved by providing a web specific programming language called MAWL and an associated MAWL compiler to program and generate correct web service code.

In a specific aspect of the invention, the aforementioned objects are achieved by providing a method of producing a web service application that has a reduced number of coding errors. This method begins with the step of writing a source code program in the MAWL language and subsequently inputting it to a MAWL compiler. The input web program is checked for errors with respect to the source code program; compiling the checked source code program to provide an executable web program that is as correct as the source code program. This error checking is performed before the executable web program is executed to reduce on-line problems of the generated web service.

In accordance with another aspect of the invention, the aforementioned objects are achieved by providing a system for generating a web service application. This system includes a store for storing a source code program, a processor for fetching the source code program from the store and processing this source code according to a compiler. The processor while performing this processing checks the source code for correctness issues error messages for incorrectness and generates a web service application.

DETAILED DESCRIPTION

Figure 1:
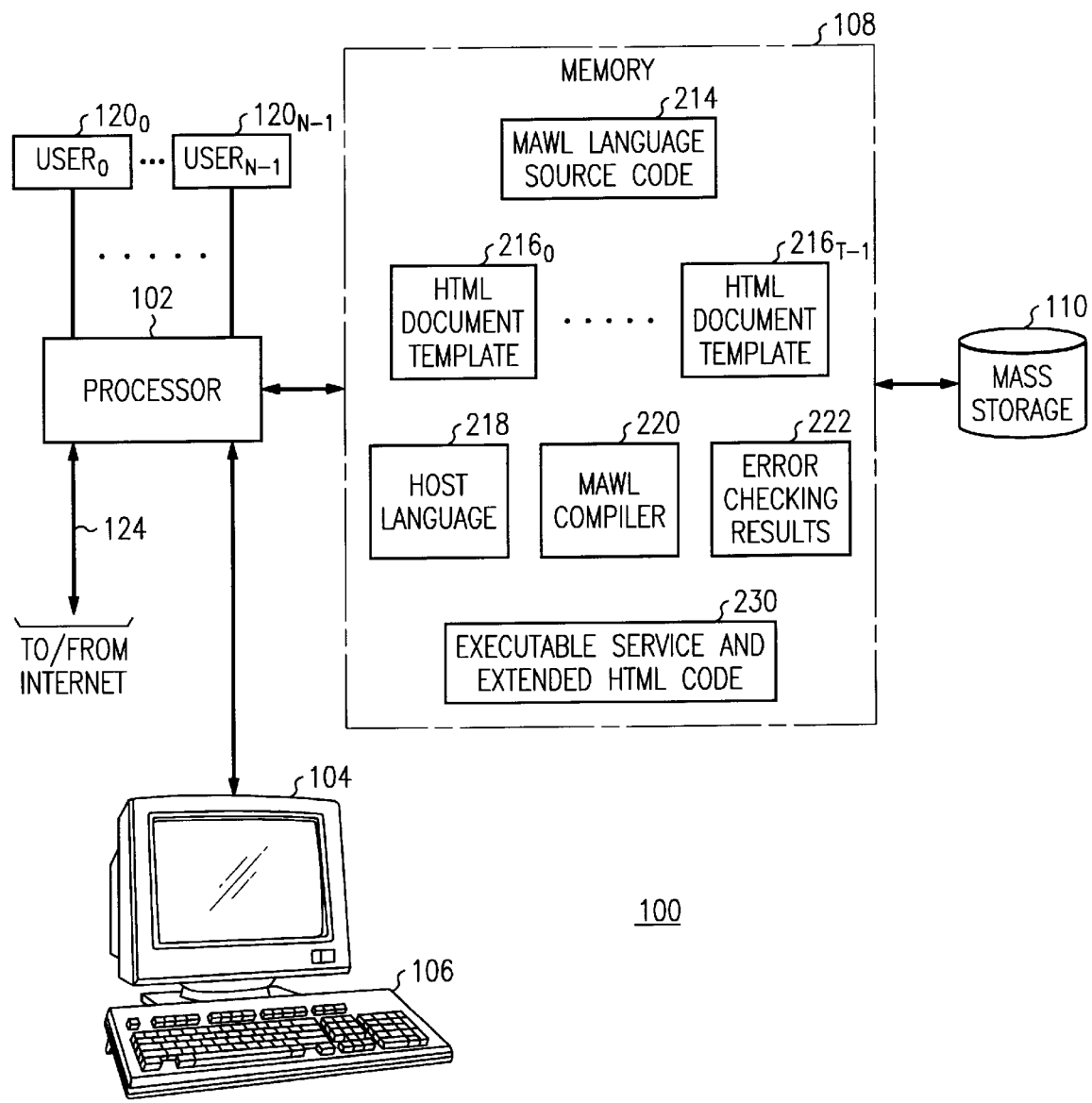
FIG. 1 illustrates a computer system that generates a World Wide Web service program from MAWL language source code and HTML document template inputs and executes the generated program to provide a world wide web service to user.

Referring now to FIG. 1, a computer system 100 is shown. Computer system 100 may be of various types such as workstations, high performance personal computers or multi-user servers. Preferably, the computer system 100 is a Silicon Graphics Incorporated (SGI) workstation operating as a server. An SGI workstation has a MIPS processor for processor 102. A programmer using computer system 100 would, to some extent, use display 104 and keyboard 106 to write and/or correct web source programs. The programmer is assumed to have access to the MAWL compiler, and to an appropriate host language such as Standard ML of New Jersey, version 108.5 or compatible version. This version of ML is available from Bell Laboratories in Murray Hill, N.J. Display 104 and keyboard 106 are also used to control the submitting and compiling of web source code programs into web service programs, i.e., service code. Computer system 100 also has store 108 which is typically a combination of ROM and RAM. The store 108 stores various types of information such as instructions for the processor 102 to follow, data inputs for the processor 102 to process according to the instructions and data outputs that are the result of the instructions and the data inputs. The store 108 may also, under processor control, receive information from mass storage unit 110 or store information into mass storage unit 110. Additionally, because the computer system 100 is typically a server that ultimately provides one or more web services, a number of web users $120_0$–$120_{N-1}$ are connected to computer system 100 via processor 102. The web users $120_0$–$120_{N-1}$ would be using web browsers such as Netscape® by Netscape Incorporated and Mosaic® by National Super Computing Center of the University of Illinois.

One or more web sites may be located within a server such as computer system 100. The computer system 100 is connected via line 124 to the Internet and follows the HTTP protocol.

Figure 2:
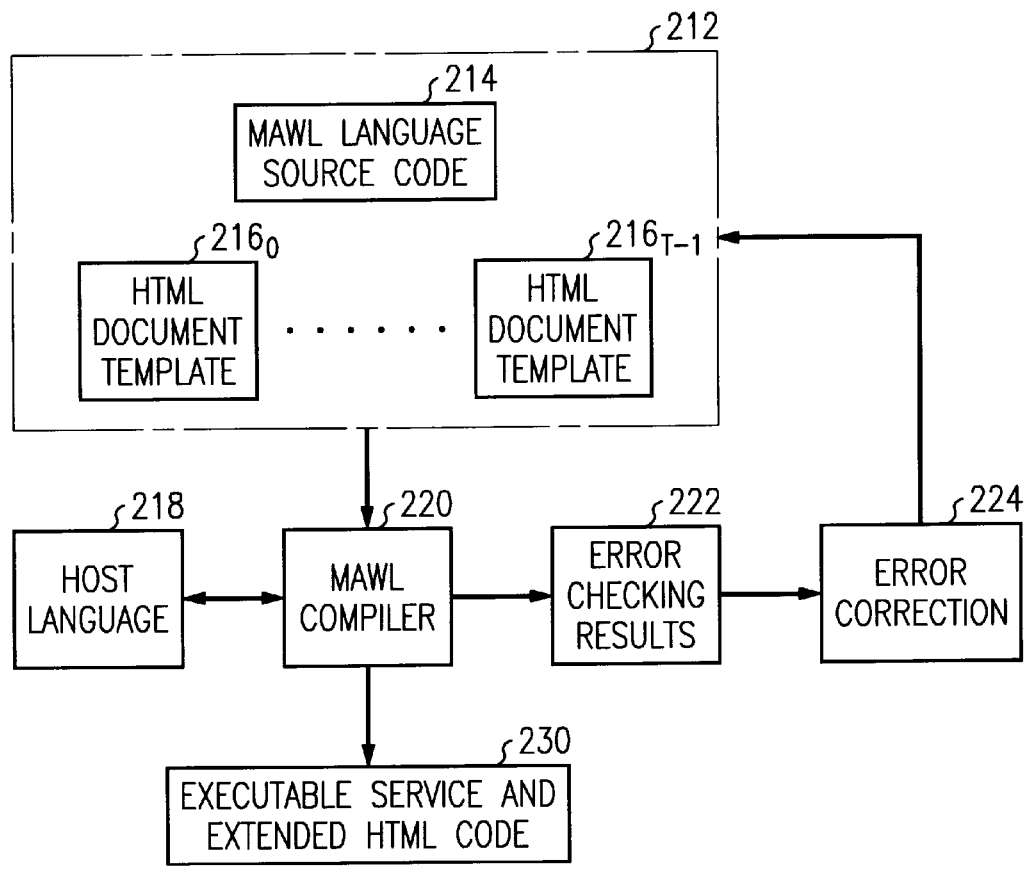
FIG. 2 illustrates in block diagram form the method of generating a World Wide Web service program.

Referring now to FIG. 2, method 210 is illustrated of how MAWL service code 230 which has a very high level of correctness is provided. First, a programmer writes source code in the MAWL service-logic language, using the rules for MAWL and the host language, e.g. ML. The programmer also provides one or more documents, also known as forms, written in MAWL extended HTML (MHTML) $210_0$–$210_{T-1}$. Together, these items form the MAWL source program 212. This MAWL source program 212 is inputted to a MAWL compiler 220. The source code for the MAWL compiler is listed in appendix A1–A111 at the end of this specification. The MAWL compiler 220 checks for errors in the source program 212. If errors are found, they are listed or otherwise identified in the error-checking results 222 for correction. Once the errors are corrected, the MAWL compiler 220 then generates executable service code.

Set up of MAWL Compiler

First, configure the system for running scripts

Assign a "Script Alias" in the server configuration file

The alias, which appears in the URL's of a user's programs, is usually called $LOGNAME-bin, and it's usually set to point to the user's ~/www/bin/ directory. For example, a sample "script" directory for myname, /home/myname/www/bin, is referred to by the URL http://machine.home.com:8888/myname-bin. Typically, the server administrator (in this case of server "machine") makes this addition.

Next, make this user's ~/www/bin/ readable and searchable by other users.

Use of MAWL Compiler

Creation of Web services via MAWL begins with creating program files of two sorts: a single service-logic program, which is given the suffix ".mawl", and one or more Mawl extended HTML files, each given the suffix ".mawl". The service-logic file describes the control flow and computation aspects of the service. The MAWL extended HTML files describe layout information for particular pages to be displayed. The languages for creating such files are described below. To compile a program, in this case myprogram.mawl, the following command line is given:

mawlcc myprogram while operating in a directory containing myprogram.mawl. Any MAWL extended HTML, forms that are declared in myprogram.mawl should be in the same directory, with the extension .mhtml in order to prevent an error message.

Running the MAWL compiler on the source code program called "myprogram.mawl," first creates a small shell script called "myprogram" in the submitter's ~/www/bin, along with an ML heap that contains the code and pre-processed MHTML. At this point, the newly created service could immediately be run by fetching the URL http://server:portnum/myprogram/session-name.

Alternatively, the command line, mawlcc -b cml myprogram, will compile the service into an HTTP server, which the user could later run from the command line such as:

./myprogram {portnum}.

The program created by the MAWL compiler in response to this command would then be accessible at the URL: http://myhost:portnum/session-name.

To explain the structure of the source code that is submitted to the compiler, an example is given below, and also detailed descriptions of the service-logic and MHTML languages.

The following example starts with a straightforward MAWL program that prompts the user for his/her name, and then provides a fancy greeting which is personalized.

```
%%
    session fancyGreeting {
        mhtml { } —> { "firstname", "lastname" }: login;
        mhtml { "firstname", "lastname" }: greeting;
        auto { "firstname", lastname" }: names;
        names=mhtml.put [ login, ({ }) ];
        mhtml.put [ greeting, names ];
}
```

EXAMPLE 1

Service Logic for a Personalized Fancy Greeting Service

The first three lines of the source code program are declarations, the last two lines contain the service-logic. The lines beginning with the keyword mhtml declare certain properties about MHTML documents that are found in other files. In this case, two documents are declared, one called "login" and one called "greeting". A variable called "names", which is a record with two fields called "firstname" and "lastname", is also declared.

Note that the "login" document is declared with an arrow (→) between two record descriptions. This requires an empty record as its input parameter and produces a record with two fields "firstname" and "lastname" as its output parameter. The "greeting" document is declared to take two inputs "firstname" and "lastname", and produces no output (signified implicitly by the lack of an arrow). The code for the service-logic works as follows: the command: names= mhtml.put [login, ({ })] commands the server to display the "login" document with no input, and put the result (the information entered by the user in fields on this document) into the variable "names". The command thereafter commands the server to display the "greetings" document with the contents of the variable "names" as its input.

This completely describes the service-logic for the fancy "greeting" program, what remains is to describe the format of the two pages given by the two MHTML code files "greetings" and "login". Following the description of the fancy "greeting" program and its support files, a description of the MAWL service logic language in general will be given.

```
<HTML>
<HEAD><TITLE>Login form</TITLE></HEAD>
<BODY>
Please fill in the fields below with the requested info:
<P>
First name: <INPUT NAME="firstname"><P>
Last name: <INPUT NAME="lastname"><P>
</BODY>
</HTML>
```

EXAMPLE 2

A form File Needed by the Fancy Greeting Program

```
<HTML>
<HEAD><TITLE>Greeting form</TITLE></HEAD>
<BODY>
Rather than "Hello, World", we now say:<P>
Hello, <MVAR NAME="firstname"><MVAR NAME="lastname">!
</BODY>
</HTML>
```

EXAMPLE 3

Another Form File Needed by the Fancy Greeting Program

In the first mhtml file, example 2 above, the presence of the variables "firstname" and "lastname" within the input tags indicates the MAWL field names in which the results will be stored. In the second mhtml file, example 3 above, the presence of the MVAR tags indicates that that the corresponding input values will be inserted there. This completes the description of the Fancy Greeting service program and its files.

Details of the MAWL Service Logic Language

Program Structure

Immediately below is an annotated skeleton of an example of a MAWL program:

```
→ fun hostLanguageFunction(x) = x // any host (ML) code
    could go here
%%
→ // one or more sessions could go here
→ session test {
    // this declares aForm to take anInput and return anOutput
        mhtml { anInput } —> { anOutput } : aForm;
    // this puts aForm with "aLiteralString" as the anInput argument
        mhtml.put [ aForm, ({anInput="aLiteralString"}) ];
}
```

Each MHTML form needs to appear in the current directory of a file of the same name with the suffix .mhtm1. In the above case, aForm.mhtrml would need to be in the current directory of file aForm. MAWL makes use of a host programming language for general-purpose computation. This allows the MAWL programmer to make use of any library functions or procedures available through the host language without compromising the correctness guarantees given by MAWL. The host programming language for the MAWL compiler is Standard ML of New Jersey. The lines prior to the delimiter "%%" contain function or procedure declarations from the host language that may be referenced later in host-language fragments. Host language expressions can occur within the body of the MAWL service-logic program, and can be assigned to MAWL variables of the proper type. Syntactically, host-language fragments within the body of the program are introduced with parentheses. The MAWL compiler does not interpret anything within the parentheses, instead, everything within the parenthesis is passed unchanged to the host language compiler. The rules of MAWL's typing scheme place type obligations on all such host language fragments, e.g. assignments of a host-language expression to a MAWL variable require the type of the variable and expression to agree. Fragments which do not meet such obligations are detected at compile-time and reported as errors for correction.

Basic Grammar and Features of the MAWL service-logic Language

```
types (1)
    string
    integer
    boolean
    unit (a.k.a. void)
    { name, name : type } (6)
    type list
declarations
    mhtml type : formName; (2) (3)
    mhtml type —> type : formName; (2) (4)
    auto type : varName;
    auto type: varName = expr; (5)
    static type : varName = expr; (5)
    typedef type : newTypeName;
statements
    statement; statement
    while expr { statementlist }
    for expr ; expr ; expr { statementlist }
    if expr { statementlist } else { statementlist }
    break;
expressions
    var
    (host-language-expression)
    expr , expr
    var = expr
    var = html.get[ expr ] (7)
    var = mhtml.put[ form, expr ]
```

```
    var = mhtml.put[ form, expr ] handle "name" —> [ expr] (8)
    var = mhtml.put[ form, expr ] handle any —> [ expr ] (8)
```

(1) Types can be built from any combination of string, integer, boolean and unit, plus structures with named members of any type, plus lists of any type.
(2) Mhtml forms must have inputs and outputs of structure type.
(3) A single type in an MHTML declaration means a form returning the empty structure.
(4) A form declared to be of type A —> B takes a structure of type A and returns one of type B.
(5) MAWL variables are declared to be either automatic or static. Automatic variables persist only for the duration of one user-interaction (one session), while static variables persist for the life of the service. Automatic (auto) variables may, and static variables must, have an initial value.
(6) Structure members are of type string by default.
(7) The expression in file html.get is the URL to get (a string), its result is the data returned by the server (a string).
(8) Handle clauses allow thr program to use special hyperlinks to continue the current session. These special links are called MEXCEPTION's, and the two forms of handle clause allow the programmer to respond to particular exceptions (with the string literal) or to bind an identifier to whatever MEXCEPTION was selected (with a new variable name). In both cases, the expression after the arrow is taken as the return value of the form.

Idioms

Request/response

Responses from forms are almost always assigned to local variables, which need to be of the same type as the form's return value:

```
    mhtml { } —> { name, PIN } : myform;
    auto { name, PIN } : ret;
    ret = mhtml.put[ myform, ({ }) ];
```

Response forms may advantageously use the typedef construct. A typedef for the form immediately above is illustrated in the following fragment:

```
    typedef { name, PIN } : personalData;
    mhtml { } —> personalData : myform;
    auto personalData : ret;
    ret = mhtml.put[ myform, ({ }) ];
```

Following links

In order to follow a link, define a variable that gets changed in a exception handler, such as the variable whereToGo in the following example.

```
    mhtml { } —> { } : aform;
    auto string: whereToGo =("");
```

```
    mhtml.put[ aform, ({ }) ]
       handle any —> [ whereToGo = any, ({ }) ];
    if (whereToGo <> "" ) {
       . . . go there . . .
    }
```

Advanced Features

OK Functions mhtml type→type:formName!(checkFunction); checkFunction takes a host-language structure and returns a result which is a bool * string in ML. If the argument is "OK", the function ought to return (true,_) and if not, the function ought to return (false, reason) where reason is the explanation of what is wrong with the input.

Server Push mhtml.put [form, (expr1)] pushing (expr2) upon varname

This construct puts the form called "form", passing expr1 as the argument, and keeps the connection to the browser open. As long as the connection remains active, the form is replaced every time the variable "varname" changes. The replaced form is "form" with expr2 as the argument.

Details of the MAWL Extended HTML Language

MHTML contains HTML as a proper subset. The most important marks added to html in the MHTML language are the following:

MHTML Mark-ups

```
<MVAR NAME=x> replace this markup with variable "x"
<A MEXCEPTION=name> text</A>: raise exception "name" in the program.
Appears as a link in the HTML
<A MVAREXCEPTION=name> text</A>: raise exception given by the value
of variable name. Appears as a link in the HTML
<A MHREF=name> text</A>: hyperlink to URL given by value of variable
name
<MEXIT>text</MEXIT>: Appears as a link that exits the service
<MITER NAME=x MCURSOR=y> . . . block . . . </MITER>: repeat the
contents of block once for every element of the list "x". The variable "y" takes
on each value in "x" in turn.
<IMG MVARSRC=varname MVARALT=varname
MVARALIGN=varname>
<INPUT NAME=iname MVARTYPE=varname MVARVALUE=varname>
<TEXTAREA NAME=iname MVARROWS=varname
MVARCOLS=varname>
```

The MVAR mark is for variable replacement; the variable-name is declared separately in the service logic, and is a variable of any scalar printable type. The MITER mark is used to iterate over the list-typed variable specified by the NAME attribute; there is an iteration variable MCURSOR that is set to the value of each element, and the MHTML enclosed by the MITER marks is expanded once for each element. The MVAR mark is legal anywhere ordinary text is legal, and the MITER mark is legal only in places where zero or more of its enclosed MHTML are legal (this restriction guarantees that the resulting HTML document will conform to the standard HTML grammar).

Consistency Requirements Between MAWL Programs and MHTML Files

In order to eliminate certain HTML programming errors, all MHTML documents used in a MAWL program must be declared according to the syntax in Example 4 shown below on the next page.

```
declaration:
    mhtml record-declaration : doc-name+ ;
    | mhtml record-declaration —> record-declaration : doc-name+ ;
```

```
record-declaration:
    { field-decl-comma-list }
field-decl-comma-list:
    field-decl
    | field-decl-comma-list , field-decl
field-decl:
    field-name : type
    | field-name
```

EXAMPLE 4

MHTML Declarations

The first part of an mhtml declaration declares the type of the form, giving the type (always a MAWL record) of the data passed from the program to the form, and optionally a type for the data coming back from the form. Following the type specification is a list of the form identifiers being declared to have the type. To display a particular form, it must be invoked with a record argument of the appropriate type according to the syntax as shown in Example 5 below; the return value must also correspond to the declaration. Note that the MAWL expression for serving a document has the flavor of a remote procedure call.

```
expr:
    mhtml.put [ doc-name, expr ]
```

EXAMPLE 5

MHTML Usage

The uses of MHTML forms that are found in the body of the mawl service-logic program must be consistent with both the declarations given in that program, and the inputs and outputs found in the corresponding .mhtml files.

In Operation

Consider operation during a more complex MAWL program such as the one in Example 6 given below. Such a service would be (relatively) unthinkable if written from scratch using prior art html, but such a service is easy to build using the MAWL language. The service in this example is an old guessing game, where the host computer system chooses a number between 1 and 100, and the player/user must figure out which number was chosen.

It is probably easy to figure out most of what this program is doing, but take special note of the static variables that keep track of how many users have played the game, and look at the interplay between the host language fragments (the entries in parentheses) and the rest of the language. Note how there are two entry points, one for playing the game and one for looking up some statistics and who has achieved the quickest victory. Also note that MAWL variables can be used within the host language fragments, and the return result of the host language fragments is automatically translated into the appropriate MAWL representation. Any type errors are caught by the MAWL compiler at compile time.

```
fun number ( ) = let
    val s = Time.toSeconds(Time.now( )) in s mod 99 end
%%
static integer: numPlayed=(0), numWon=(0), minGuesses=(0);
static string: bestPlayer=("");
session play {
    mhtml { suggestion } —> { guess } : askUser;
    mhtml { } —> { name, guess}: initQuestion;
    auto integer: mynum=(number( )), guesses=(0), guess=(0);
    auto string : suggestion = ("");
    auto { name, guess } : initresult;
    auto { guess } : result;
    auto string: name;
    numPlayed = (numPlayed + 1);
    initresult = mhtml.put [ initQuestion,
        ({ guessno=makestring guesses,
        suggestion=suggestion}) ];
    guess = (jcrlib.atoi (#guess initresult));
    while (mynum <> guess) {
        suggestion = (if guess<mynum then "higher" else "lower");
        result= mhtml.put [
            askUser,
            ({ guessno=makestring guesses,
            suggestion=suggestion}) ];
        guess = (jcrlib.atoi (#guess result));
        guesses = (guesses + 1);
    }
    numWon = (numWon + 1);
    if (minGuesses < guesses andalso minGuesses <> 0) {
        mhtml { best, gamelength } : youWin;
        mhtml.put [ youWin,
            ({ best=bestPlayer,
            gamelength=makestring guesses }) ];
    } else {
        mhtml { } : youBest;
        bestPlayer = (#name initresult);
        minGuesses = guesses;
        mhtml.put [ youBest, ({ }) ];
    }
}
session admin {
    mhtml { played, won, best }: highScores AndInfo;
    mhtml.put [ highScoresAndInfo, ({
        played=makestring numPlayed,
        won=makestring numWon,
        best=bestPlayer }) ];
}
```

EXAMPLE 6

Service Logic for a Guessing Game

The MAWL language also has explicit synchronization constructs; exception handling facilities; server-push constructs, and an MHTML syntax used to specify iteration which the MAWL compiler will analyze for errors and compile into errorless service code when all errors are corrected.

Advantages of MAWL System

The MAWL system provides the infrastructure for programmers that is lacking in the prior art for creating complex and reliable web services.

Programming Abstractions

State that is passed from document to document can be expressed in a natural way using MAWL variables. MAWL also provides access to several other important programming abstractions: the ability to control the scope and persistence of information by giving appropriate declarations of MAWL variables, the ability to sequence pages using MAWL's conditional and looping constructs of the MAWL language, and the ability to protect stored state using critical regions.

Web-specific Optimization

MAWL relieves the programmer of the task of coding many repetitive tasks within a Web service. For example, the MAWL programmer does not need to code HTML pages telling the user that a particular field in a form was not filled out because MAWL automatically supplies such an error message and it also supplies hyperlinks back to the original form for quick correction.

Analysis

In circumstances where, before MAWL, an entire document would have to be generated dynamically, users of MHTML are able to compose their documents statically. Specifying portions that are run-time variabilities using variables with the MVAR syntax. In this way, the MHTML can be parsed at compile time and analyzed for correctness independent of execution. MHTML is an extension of HTML described within the Standard Generalized Markup Language (SGML). This could enable users to check, if desired, that the HTML documents generated will conform to a particular HTML standard. The MAWL compiler currently detects some classes of errors at compile time. For example, if the mawl program made use of an MHTML document such as:

```
<HTML>
<HEAD><TITLE>A basic html program </TITLE></HEAD>
<ODY>Hello,world.</BODY>
</HTML>
```
The MAWL compiler would generate the message:
ERROR: Parse Error : Missing <BODY> markup in file helloerr.

Additional checks to conform to stricter html standards can easily be accommodated as these standards evolve.

The MAWL compiler also checks that the fields that are declared in the MAWL service logic program as inputs to a particular MHTML form are actually used by the forms and their declared types are correct with respect to the way they are used in the form. For example, if the MAWL program is as follows:

```
%%
session hello{
mhtml {name:string}: hello
mhtml.put [hello, (name="joe") ];
}
```
and the mhtml file hello.mhtml did not make use of the input variable "name", the MAWL compiler would give an error message:
ERROR: Type Error: MHTML file "hello" doesn't use declared variable "name"

Platform Independence

The MAWL system has been designed to accommodate a number of parameters of variation. Because no construct in the service-logic or MHTML language is specific to a particular browser, the MAWL compiler can easily be extended to deal with changes to popular browsers such as Netscape Navigator, or to new browsers. No construct in the service-logic language is specific to a hypertext setting, hence MAWL allows for the possibility of using the same service-logic program in conjunction with markup languages for other media and other interfaces, such as telephones and television set-top boxes. For telephones and television set top boxes, other interface specifications files would be used instead of specialized interface language MHTML. The strict separation of service-logic and layout into distinct languages makes for a number of other advantages as well: MHTML files used for layout can be changed frequently without touching the service-logic files. The fact that the MHTML documents do not make use of programming constructs enables them to be created and maintained by nonprogrammers.

Thus, there has been described a method of generating web service code using the MAWL language to define the desired functionality in an expressive source code and the MAWL compiler to check that source code for common errors and self-inconsistencies and, after all such errors are corrected, compile the source code into web service code. While the invention has been particularly illustrated and described with reference to preferred embodiments thereof, it will be understood by those skilled in the art that various changes in form, details, and applications may be made therein. For instance, the MAWL compiler is written in ML, but any general purpose programming language could be used instead, and a MAWL compiler in some version of the C programming language is contemplated. It is accordingly intended that the appended claims shall cover all such changes in form, details and applications which do not depart from the true spirit and scope of the invention.

What is claimed is:

1. A method of generating service code for a service application, comprising the steps of:
   a. inputting a source code written in a language for a distributed network to a compiler;
   b. inputting at least one separate document to said compiler;
   c. compiling said source code and said document into a program to provide a state defining executable service code program that is capable of processing state information, wherein the state information is capable of at least one of:
   being passed from document to document, and
   controlling the scope and persistence of information within or between documents.

2. The method of claim 1, between step b and step c, further comprising the step of:
   checking all forms for errors and consistency with said source program.

3. The method of claim 1, wherein:
   said error checking step includes checking said forms for correct syntax and checking for type-correct substitution of variables.

4. The method of claim 3, wherein
   said error checking step includes parsing said source program and analyzing said parsed source program for correctness before said source program is compiled into executable code.

5. The method of claim 1, wherein said error checking step includes checking said forms to ensure that only HTML can be generated.

6. The method of claim 1, wherein said error checking step includes the steps of:
   identifying an error in said source program; and
   correcting said identified error in said source program before said compiling by said compiler.

7. The method of claim 1, wherein said error checking step includes the steps of:
   identifying each error in said source program; and
   correcting each said identified error in said source program respectively before said compiling by said World compiler.

8. A method of producing a service code application, comprising the steps of:

storing a source code program written in a World Wide Web specific language in a memory of a computer system;

storing at least one MHTML document template associated with said source code program in said memory of said computer system;

inputting said source code program and said at least one MHTML document template to a World Wide Web specific compiler executing within said computer system;

checking said source code program and said at least one MHTML document template for errors by said World Wide Web specific compiler; and compiling said checked source code program and said at least one MHTML document template into a compiled World Wide Web program to provide an executable World Wide Web program that is as correct as said source code program, and that is capable of processing state information, and said at least one MHTML document template before said executable World Wide Web program is executed.

9. The method of claim 8, wherein:

said error checking step includes checking source code program for type-correct substitution of variables.

10. The method of claim 8, wherein said error checking step includes parsing said source code program and analyzing said parsed source code program for correctness before said source code program is compiled into executable code.

11. The method of claim 8, wherein said error checking step includes the steps of:

identifying an error in said source code program; and correcting said identified error in said source code program before said compiling by said World Wide Web specific compiler.

12. The method of claim 8, wherein said error checking step includes the steps of:

identifying each error in said source code program; and correcting each said identified error in said source code program respectively before said compiling by said World Wide Web specific compiler.

13. The method of claim 8, wherein said source code program specifies all of the service logic and the MHTML document templates do not specify any of the service logic.

14. The method of claim 8, wherein changing said MHTML document templates changes a presentation of said service logic without changing said service logic itself.

15. A method of generating from a source code program written in a MAWL language a service application program that is as correct as the source code program, comprising the steps of:

a. inputting the source code program written in the MAWL language to a MAWL compiler;

b. checking the source code program for correctness; and c. compiling said checked source code program into a run-time service application that is capable of processing state information.

16. The method of claim 15, between step b and step c, further comprising the steps of:

generating an error message identifying an error in said source code program;

correcting said identified error in said source code program to provide a corrected source code program; and inputting said corrected source code program to said MAWL compiler.

17. The method of claim 15, wherein said step c further comprises the step of parsing said inputted source code program.

18. A method of producing a service application that is free from coding errors, comprising the steps of:

typing a source code program in an expressive MAWL language;

inputting said source code program written in the MAWL language to a MAWL compiler;

inputting at least one MHTML form program to said MAWL compiler with said source code program;

checking said source code program and said at least one MHTML form program for errors;

correcting all errors in said source code program and said at least one MHTML form program discovered by the checking step; and compiling said source code program into a compiled web program and providing an executable web program that is as correct as said source code program, and that is capable of processing state information, before said executable web program is executed.

19. A system for providing a World Wide Web service, comprising:

means for storing a source code program;

means for generating World Wide Web service code from said source code program;

said means for generating World Wide Web service code having means for issuing an error message if an error is found in said source code program; and means for submitting said source code program to said means for generating World Wide Web service code;

wherein said generating means generates correct World Wide Web service code from said source code program if said source code program does not have an identifiable error or generates an error message if said source code program has an identifiable error, said service code being capable of processing state information.

20. A method of generating service code for a service application, comprising the steps of:

a. inputting a source program written in a World Wide Web specific language to a World Wide Web specific compiler;

b. inputting at least one separate form program to said World Wide Web specific compiler;

c. checking said source program for errors by said World Wide Web specific compiler; and d. compiling said checked source program into a compiled World Wide Web program to provide an executable World Wide Web service code program that is as correct as said source program, and capable of processing state information, before said executable World Wide Web service code program is executed.

* * * * *